No. 12,230. REISSUED JUNE 14, 1904
R. L. CUMNOCK.
AUTOMATIC THREADING DEVICE FOR LOOM SHUTTLES.
APPLICATION FILED JAN. 26, 1904.
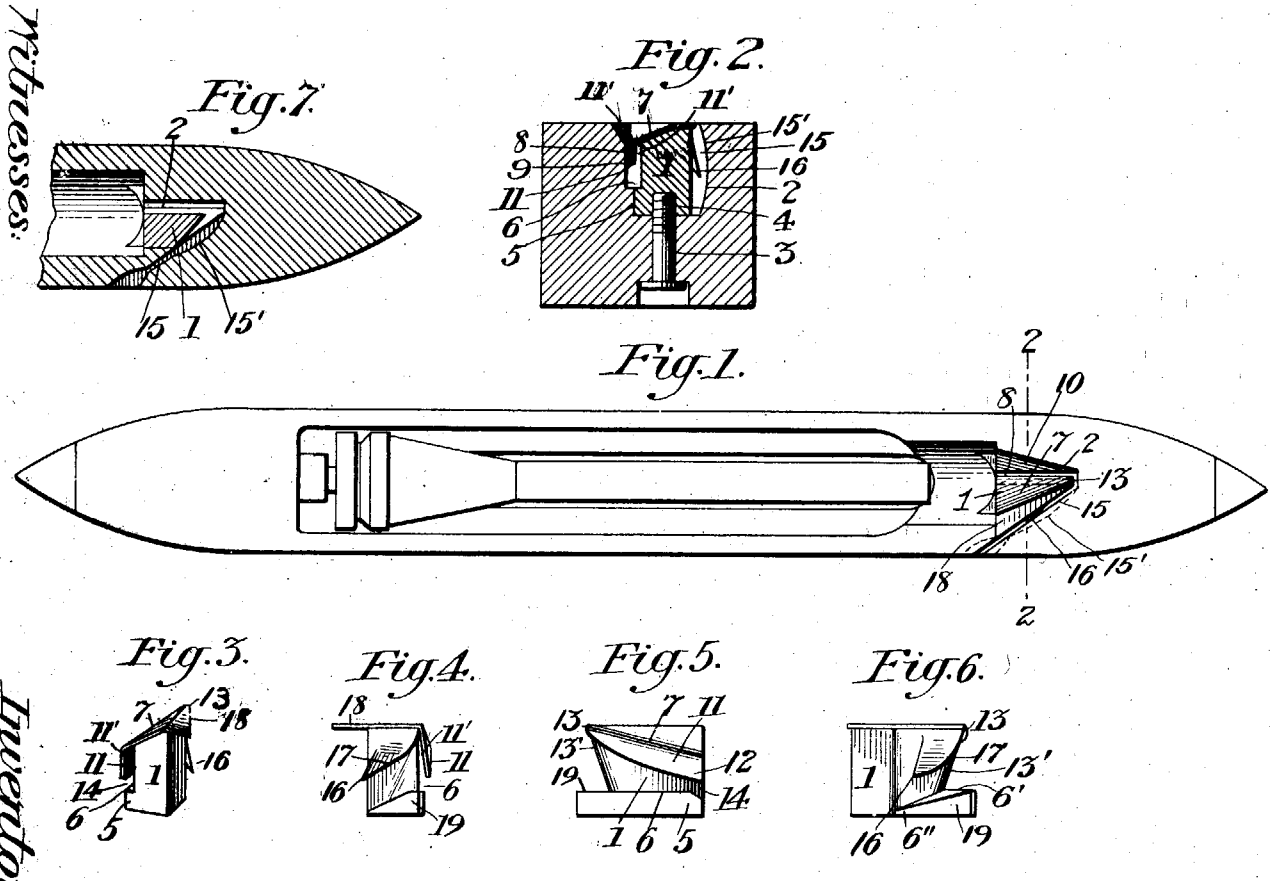
Witnesses:
C. Middleton
Edward L. Reed.
Inventor.
Robert L. Cumnock
by Ellis Spear
Atty No. 12,230. Reissued June 14, 1904.

UNITED STATES PATENT OFFICE.

ROBERT L. CUMNOCK, OF ANDERSON, SOUTH CAROLINA, ASSIGNOR OF FORTY-NINE ONE-HUNDREDTHS TO JAMES A. BROCK AND ROBERT E. LIGON, OF ANDERSON, SOUTH CAROLINA.

AUTOMATIC THREADING DEVICE FOR LOOM-SHUTTLES.

SPECIFICATION forming part of Reissued Letters Patent No. 12,230, dated June 14, 1904.

Original No. 736,500, dated August 18, 1903. Application for reissue filed January 26, 1904. Serial No. 190,752.

*To all whom it may concern:*

Be it known that I, ROBERT L. CUMNOCK, a citizen of the United States, residing at Anderson, Anderson county, South Carolina, have invented certain new and useful Improvements in Automatic Threading Devices for Loom-Shuttles, of which the following is a specification.

My invention relates to self-threading shuttles.

By my invention the weft or bobbin is simply placed in the shuttle, and it will thread itself automatically no matter in what position or box of the loom the shuttle is placed, (there being two boxes, one at each end of the loom.)

The device is equally applicable to that form of loom-shuttles by which the weft is changed automatically, and the strength of my shuttle is not impaired by cutting away the front end of the shuttle or throwing it out of balance to any material extent.

My object is to simplify the construction and by reducing the weight of the threading device to avoid throwing the shuttle out of balance to any material extent.

My invention consists of the structure of the automatic threading device which is inserted in the body of the shuttle and which will be particularly described hereinafter and its novel features particularly pointed out in the claims.

In the accompanying drawings, Figure 1 is a plan view of a shuttle embodying my invention. Fig. 2 is a cross-sectional view on line 2 2 of Fig. 1. Fig. 3 is a perspective view of the automatic threading device looking from its rear or inner end. Fig. 4 is a front view. Fig. 5 is a side view looking from the right of Fig. 4. Fig. 6 is a side view looking from the left of Fig. 4. Fig. 7 is a sectional plan view.

The threading device consists of a metal block 1, which is held in a recess 2 in the shuttle by a screw 3, extending through the body of the shuttle and entering a screw-threaded recess or socket 4, formed in said block 1. The block 1 has a projection 5, extending longitudinally along its lower portion on one side, forming a ledge 6.

The upper surface of the threading device is downwardly and inwardly inclined at 7 to direct the thread at the beginning of the automatic threading action to the slit 8 between the threading device and the opposing wall 9 of the recess 2, formed in the shuttle, as before described, and for the purpose of initially guiding the thread at the beginning of the automatic threading action the body of the shuttle also has an inclined surface 10 formed thereon. The upper inclined surface 7, as shown in Fig. 2, extends laterally beyond the side of the block 1 and is provided with a depending flange 11, arranged at a slight distance from the side of the block 1 and overhanging the ledge 6. The filling-thread on passing down through the slit 8 will be thrown under the lower edge of the depending flange 11 by the whipping action of the said thread around the bobbin. The flange 11, it will be noticed, is much deeper, as shown in Fig. 5, at its inner or rear end 12 than at its point or front end 13, and a narrow throat or opening 14 is thus provided between the rear end of the flange 12 and the ledge 6 for the whipping of the weft-thread as it runs off of the bobbin, and when once under the said flange 11 it will be retained by the tension on the thread. When the shuttle reverses its motion after the thread has been caught by the flange 11, the said thread will be directed about the upper front point 13 of the automatic threading device and into the inclined slot 15, extending to the delivery-eye of the shuttle.

It will be seen that at the point of the block where the longitudinal slit 8 communicates with the inclined slit 15 there is no obstruction to the free passage of the thread into the said slit 15, as the slit 8 communicates freely with the slit 15 around the point of the device.

On the side of the threading device opposite to that upon which the flange 11 is located is a spur or projection 16, having its point extending across the slot 15, and an inclined edge 17, extending from the point 13 downwardly to the point 16. The thread as it passes through the slot 15 will be directed downwardly along the edge 17 of the spur to the point thereof. This spur or catch, as shown in Fig. 2, is arranged so that its point projects outwardly and downwardly from the side of the block 1, and it is adapted to catch the filling-thread and prevent it from being withdrawn backwardly through the slot or in the direction of the point 13 of the threader, so that there will be no liability of the thread flying from the end of the shuttle after it has once been threaded through the delivery-eye. The threading device is provided with a flange 18, extending laterally therefrom to overlie a portion of the body of the shuttle along the margin of the slot 15.

It will be noticed that the threading device is of such proportions and is so located that the slit 8 lies to one side of the axial center of the bobbin, thus bringing the way or channel 11′, which is located under the flange 11, in such a position relatively to the said axial line that the whipping action of the thread in leaving the bobbin will cause the said thread to be thrown under the said flange 11 and into the channel 11′.

The threading device is also provided with a forward extension 19 at its lower portion, extending forward of the vertical plane of the front point 13, so that the thread may find a bearing-surface extending along one entire side of the threading device, around its front end, and partly along its opposite side, this bearing-surface being formed by the ledge 6 along one side and the continuation of said ledge around the front point of said threading device, as at 6′, and along its other side to the point 6″, the ledge 6′ inclining downwardly.

The general form of the threading device is wedge shape, with its point 13 toward the adjacent end of the shuttle.

It will be seen from the above that the threader is practically one body, and it is only necessary to attach this in proper position in the loom to provide the automatic threading means in connection therewith. The single block 1 carries all of the devices which are necessary for the threading operation. The spur 16 projects slightly across the vertical plane of the edge of the slot 15, so that any tendency of the thread to move backwardly along the said slot will bring it into engagement with the spur. For this purpose the wall 15′ of the slot 15 is slightly undercut, so that the spur can project across the vertical edge of the said slot.

The front end of the device inclines inwardly, as at 13′.

I claim as my invention—

1. An automatic threading-block for loom-shuttles having a depending flange on one side thereof extending longitudinally of the shuttle and a spur projecting from the other side of the block adapted to extend across the inclined slot extending to the thread-delivery eye, substantially as described.

2. In combination with a shuttle having a longitudinal slit 8 for the thread, a depending flange forming one margin of the slit and extending longitudinally of the shuttle and under which the thread is whipped automatically as it leaves the bobbin, the said shuttle having an inclined slot extending to the thread-delivery eye and communicating with the slit 8 and a spur for obstructing the backward movement of the thread along the said slit, substantially as described.

3. In combination with a loom-shuttle having a slit 8 extending longitudinally and to one side of the axial line of the bobbin, an automatic threading device having a depending flange forming the margin of the said slit, the said loom-shuttle having also an inclined slot leading to the delivery-eye and a spur for obstructing the backward movement of the thread therefrom, substantially as described.

4. In combination with a loom-shuttle, an automatic threading device comprising a flange extending longitudinally and inclining upwardly toward the point of the shuttle to form a channel for the thread between itself and the side face of the device and a spur projecting from the opposite side of the said threading device to obstruct the inclined slot, substantially as described.

5. In combination with a shuttle, an automatic threading device comprising a block having a channel extending longitudinally thereof for the thread, an inclined front end adapted to form an overhanging point 13 and a spur projecting from the side of the threading device opposite that upon which the channel is located, substantially as described.

6. An automatic threading device for loom-shuttles having an inclined upper face, an overhanging flange extending longitudinally to form a channel for the thread and having upon its opposite side a spur extending across and obstructing a thread-slot in the shuttle, substantially as described.

7. An automatic threading device for loom-shuttles comprising a block of general wedge shape having a flange extending along one side to lie longitudinally of the shuttle and inclining upwardly from its inner end to the point of the device and having a projection upon its side opposite the flange to obstruct the inclined slot in the shuttle extending to the delivery-eye, substantially as described.

8. A threading device for loom-shuttles having a flange arranged to lie longitudinally of the shuttle and inclining from its inner end toward the point of the shuttle and having upon its other side an incline extending downwardly from the point and ending in a spur to obstruct the backward movement of the thread, substantially as described.

9. In combination with a loom-shuttle, a thread-feeding device comprising a block having at its end nearest the point of the shuttle a projecting upper and lower portion with a space between for the passage of the thread, and an inclined edge connecting the two portions and a laterally-projecting spur on the block, substantially as described.

10. An automatic threading device for loom-shuttles comprising a block having a flange arranged to lie longitudinally of the shuttle on one side and having a projecting spur on the other side and a ledge extending along the lower part of the block beneath the flange and around the front point of the said block and beneath the spur, substantially as described.

11. An automatic threading device for loom-shuttles comprising a block having a flange arranged to lie longitudinally of the shuttle on one side and having a projecting spur on the other side and a ledge extending along the lower part of the block beneath the flange and around the front point of the said block and beneath the spur, the latter portion of the said ledge inclining downwardly, substantially as described.

12. An automatic threading device having a flange depending on one side thereof to form a thread-channel, said flange inclining upwardly on its lower edge and extending continuously from the inner end to the extreme outer point of the device where it depends to a lesser extent, substantially as described.

13. An automatic threading device, having a flange depending on one side thereof to form a thread-channel, said flange depending to a lesser extent at the extreme point of the device than at its inner end and said device having its front end inclining from the said extreme point inwardly.

14. In combination with a loom-shuttle, an automatic threading device having a vertical flange forming one side of a thread-channel and with a longitudinal slit 8 formed by the said vertical flange and an opposing vertical wall, said slit being unobstructed vertically from the inner end to the front end of the device and communicating with an unobstructed passage around the said front end, the said vertical flange depending slightly at the front end of the device, substantially as described.

15. In combination with a loom-shuttle, an automatic threading device having a depending vertical flange forming one side of a thread-channel and arranged parallel with a vertical wall on the shuttle to form a longitudinal slit 8, inclines 7 and 10, tapered toward the point of the shuttle and arranged to direct the thread to the said slit, said slit 8 being unobstructed from the inner end of the device where the inclines begin, to the extreme front point, the said vertical flange depending slightly at the point of the shuttle about which the narrow unobstructed slit extends, substantially as described.

In testimony whereof I affix my signature in presence of two witnesses.

ROBERT L. CUMNOCK.

Witnesses:

C. J. Brock,

J. C. Harper.